United States Patent
Keller et al.

(10) Patent No.: US 10,430,536 B1
(45) Date of Patent: Oct. 1, 2019

(54) METHOD AND APPARATUS FOR YIELD CALCULATION USING STATISTICAL TIMING DATA THAT ACCOUNTS FOR PATH AND STAGE DELAY CORRELATION

(71) Applicant: Cadence Design Systems, Inc., San Jose, CA (US)

(72) Inventors: Igor Keller, Pleasanton, CA (US); Praveen Ghanta, Cupertino, CA (US); Mikhail Chetin, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/721,148

(22) Filed: Sep. 29, 2017

(51) Int. Cl.
*G06F 17/50* (2006.01)

(52) U.S. Cl.
CPC ...... *G06F 17/5031* (2013.01); *G06F 17/5077* (2013.01)

(58) Field of Classification Search
USPC ......................................................... 716/113
See application file for complete search history.

(56) References Cited

U.S. PATENT DOCUMENTS

| | | | | |
|---|---|---|---|---|
| 2008/0034338 A1* | 2/2008 | Hosono | ............... | G06F 17/5031 716/113 |
| 2008/0209372 A1* | 8/2008 | Buck | ................... | G06F 17/5031 716/113 |
| 2010/0037192 A1* | 2/2010 | Sugiyama | ........... | G06F 17/5031 716/113 |
| 2011/0289465 A1* | 11/2011 | Adams | ................ | G06F 17/5031 716/113 |
| 2017/0262569 A1* | 9/2017 | Huynh | ................ | G06F 17/5031 |

* cited by examiner

*Primary Examiner* — Mohammed Alam
(74) *Attorney, Agent, or Firm* — Vista IP Law Group, LLP

(57) ABSTRACT

An approach is described for yield calculation using statistical timing data that accounts for path and stage delay correlation. Embodiments of the present invention provide an improved approach for yield calculation using statistical timing data that accounts for path and stage delay correlation. According to some embodiments, the approach includes receiving statistical timing analysis data, identifying paths for performing timing analysis, performing timing analysis where common segments of different paths are analyzed using shared data and where subsequent stages are transformed to provide an expected correlation between stages, and generating yield probability results based on at least the results of calculating timing analysis.

20 Claims, 30 Drawing Sheets

Arrival Time Results
Illustration
510

| Results | Logical Representation |
|---------|------------------------|
| $AT_1$  | $D_1$                  |
|         |                        |
|         |                        |
|         |                        |
|         |                        |

Arrival Time Results
Illustration
510

| Results | Logical Representation |
|---------|------------------------|
| $AT_1$  | $D_1$                  |
|         |                        |
|         |                        |
|         |                        |
|         |                        |
|         |                        |

Perform Sample Wise Addition Of The
Transformed Delay Samples With The
Preceding Segment Arrival Time Results Arrival Time Results Illustration 510

| Results | Logical Representation |
|---------|------------------------|
| $AT_1$  | $D_1$                  |
|         |                        |
|         |                        |
|         |                        |
|         |                        |
|         |                        |

Perform Sample Wise Addition Of The
Transformed Delay Samples With The
Preceding Segment Arrival Time Results Arrival Time Results
Illustration
510

| Results | Logical Representation |
|---------|------------------------|
| $AT_1$  | $D_1$                  |
| $AT_2$  | $D_1 + D_2'$           |
|         |                        |
|         |                        |
|         |                        |

Store Result(s) As Arrival Time
At The End Of The Segment

Arrival Time Results
Illustration
510

| Results | Logical Representation |
|---------|------------------------|
| $AT_1$  | $D_1$                  |
| $AT_2$  | $D_1 + D_2'$           |
| $AT_{3a}$ | $D_1 + D_2' + D_{3a}'$ |
|         |                        |
|         |                        |
|         |                        |

METHOD AND APPARATUS FOR YIELD CALCULATION USING STATISTICAL TIMING DATA THAT ACCOUNTS FOR PATH AND STAGE DELAY CORRELATION

BACKGROUND

Computer aided design (CAD) tools are often used for creating and validating electronic designs such as systems, chips, and other logical representations of items to be created under certain rules or conditions. An electronic design automation (EDA) system is one type of CAD tool for creating electronic designs.

EDA tools are often used for performing design rule compliance verification, and/or correction of design rule violations such as rules (e.g. conditions) corresponding to timing analysis, and may further include, enforcement of performance parameters. Generally, modern electronic devices are required to be made using these EDA tools. This is necessitated in part by the infrastructure that is used in the manufacture of these devices and in part because of the size of the elements that make up these devices, e.g. nanometer level features.

However, as these circuits have become more complex, timing analysis has played a larger and larger role in determining how well chips should perform and what levels of yield and reliability those chips should have. Unfortunately, current techniques focus on analyzing paths independently which fails to account for interrelations between paths.

Therefore, what is needed is an improved approach for yield calculation using statistical timing data that accounts for path and stage delay correlation.

SUMMARY

Embodiments of the present invention provide an improved approach for yield calculation using statistical timing data that accounts for path and stage delay correlation. According to some embodiments, the approach includes receiving statistical timing analysis data, identifying paths for performing timing analysis, performing timing analysis where common segments of different paths are analyzed using shared data, and generating yield probability results based on at least the timing analysis. Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

DETAILED DESCRIPTION

Embodiments of the present invention provide a system, method, and product for implementing an improved approach for determining waiver applicability conditions and applying the conditions to multiple errors or warnings in physical verification tools.

Generally, the process includes receiving statistical timing analysis data for a design to be analyzed, identifying paths (e.g. set or groups of segments) for performing timing analysis processing, and performing path timing analysis on the paths. In contrast to prior path analysis, here common data is used for analysis of segments shared by paths.

One particular way to analyze the paths can include identifying a delay of each stage (e.g. worst case delay for a particular segment shared between paths) and using the delay to generate delay samples for each segment of the identified paths and generating transformed delay samples from the delay samples for subsequent segments to account for correlation between segments (e.g. transformed to give an expected correlation). Finally, the appropriate delay samples (transformed or otherwise) can be used to determine the arrival time arrival time for individual segments (e.g. by performing sample wise additions), and subsequent transformed delay samples can be added to previous segment arrival time results until an endpoint of a particular path is reached to arrive at the final arrival time for that particular path. The generated results can then be used to determine slack distributions for the paths at the chip level (e.g. required arrival time−MAX(calculated arrival time) for each path analyzed) which corresponds to expected yield.

Figure 1:
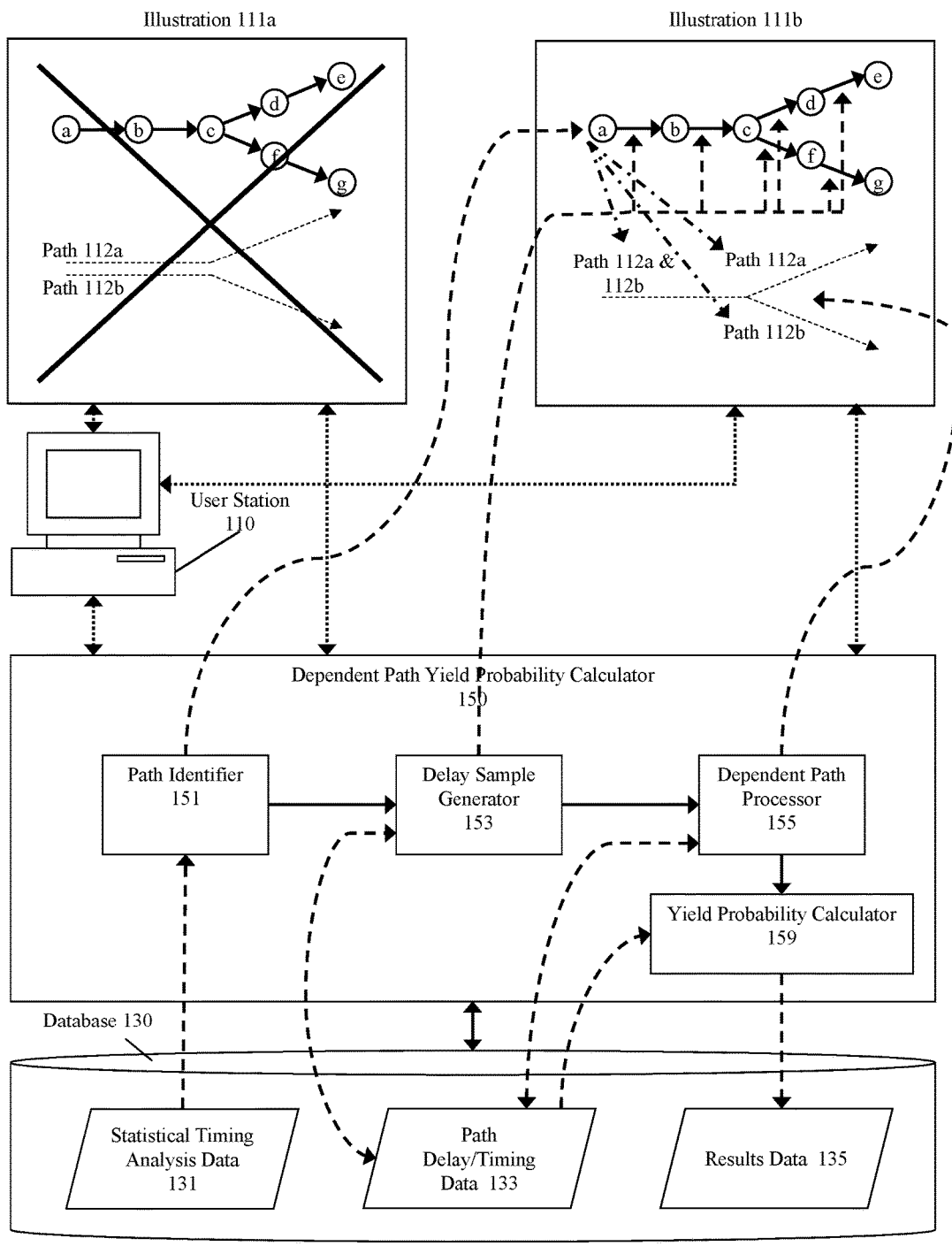
FIG. 1 depicts an example system for yield calculation using statistical timing data that accounts for path and stage delay correlation.

FIG. 1 depicts an example system for yield calculation using statistical timing data that accounts for path and stage delay correlation according to some embodiments of the invention.

Illustration 111a provides a representative illustration of a prior art technique for performing path analysis. Path analysis generally corresponds to analyzing paths to determine whether those paths will meet timing requirements. For example, a particular path may logically start where another path logically ends—e.g. a path starting at a clocked latch or flip-flop circuit and ending at another clocked latch or flip-flop. Thus, by using timing characteristics a required arrival time can be computed, e.g. by using the time period between the arrival of the appropriate clock edge at the respective latch or flip-flop circuit and various switching parameters. The difference between the required arrival time and the actual arrival time is called slack. If the slack is negative or below a minimum threshold the path is commonly considered to be critical, and the more critical paths you have the more likely it will be that if manufactured that chip will not operate as reliably or as long as required, if it even operates at all. Therefore, slack is commonly used for performing yield calculations.

The illustration 111a includes nodes a-g representing circuit elements along 2 paths. In some embodiments, nodes "a"-"g" comprise points along a circuit path where portions of the circuits (see arrows between nodes) comprise singular logical gates such as NOT, AND, NAND, OR, NOR, XOR, XNOR. In some embodiments, the portions of the circuits comprise groupings of logical gates or other circuit elements such as those used for analog or digital functions. The elements are connected to other elements over different segments such as collections one or more wires/traces, vias, and any other functionally equivalent elements. Thus, the arrow between "a" and "b" represents a first circuit portion that is connected between the two nodes ("a" and "b"), the arrow between "b" and "c" represents a second circuit portion that is connected between the two nodes ("b" and "c") and so on, with circuit portions between "c" and "d", "d" and "f", "d" and "e", "e" and "f", and "f" and "g". The illustration here represents two paths, a first path "a"→"b"→"c"→"d"→"e" (see path 112a) and a second path "a"→"b"→"c"→"f"→"g" (see path 112b). The illustrated paths include a shared portion "a"→"b"→"c". However, prior techniques fail to account for this shared portion and instead merely analyze such paths as if path 112a was independent of path 122b, and thus fail to generate computed slack results for use in yield calculations that account for the correlation between these paths.

Illustration 111b provides a representative illustration of an aspect of the inventive technique disclosed herein, where the shared portion of paths 112a/b are analyzed using shared data that accounts for path and stage delay correlation. In some embodiments, a representation of the path analysis is displayed to a user at a user station (e.g. user station 110) such as by displaying portions where shared portions are highlighted in one color while unshared portions are highlighted in another color. However, in some embodiments paths are not displayed at all or are only display at the direction of the users, such as during review or during a process for selecting paths for analysis.

User station 110 includes or provides access to the dependent path yield probability calculator 150. The user station 110 executes instructions for performing yield calculation using statistical timing data that accounts for path and stage delay correlation according to some embodiments of the invention. The user station 110 comprises any type of computing station that is useable to operate or interface with the database 130. Examples of such user stations include workstations, personal computers, or remote computing terminals. The user station 110 comprises a display device, such as a display monitor, for displaying a user interface to users at the user station. The user station 110 also comprises one or more input devices for the user to provide operational control over the user station, such as a mouse or keyboard to manipulate a pointing object in a graphical user interface. In some embodiments, the graphical user interface includes tools for controlling and/or configuring a dependent path yield probability calculator module and/or visualization tools for illustrating how sets of configuration settings are applied to a circuit to be analyzed, such as by highlighting or changing the color of paths that will be analyzed based on the current settings or highlighting or changing the color of paths that meet the provided settings.

The dependent path yield probability calculator 150 as illustrated includes a path identifier 151, a delay sample generator 153, a dependent path processor 155, and a yield probability calculator 159. In some embodiments, the various components, or their functions, of the dependent path yield probability calculator 150 are combined or separated into different components from those illustrated.

The path identifier 151 performs identification of paths upon which dependent path processing will be performed. In some embodiments, the identified paths comprise critical paths identified from timing analysis data such as statistical timing analysis data 131. For example, the paths identified for processing comprises the critical paths as identified using traditional path independent timing analysis or paths having an amount of slack below a threshold value. The identified paths may be stored in a database, such as database 130, or passed to the delay sample generator 153. Illustration 111b shows a particular example of a path identification in regard to elements "a-g", where the path identifier identifies two paths for the illustrated circuit (path 112a-b) having shared segments "a"→"b"→"c", and separate segments "c"→"d"→"e" (see path 112a) and "c"→"f"→"g" (see path 112b).

The delay sample generator 153 generates data to classify the different segments associated with the identified paths. For example, the delay classifier generates a set of delay samples for each segment of a plurality of segments associated with the identified paths and stores the generated delay samples in the path delay/timing data 133 (see dashed arrowed lines between the delay/timing data 133, delay sample generator 153, and the segments between "a"-"g").

The dependent path processor 155 performs processing on the identified paths to determine slack for respective paths, where shared segments of different paths utilize common data, and where subsequent segments are adjusted to account for delay correlation. This processing will be discussed in more detail below. However, one possible approach includes generating delay samples for each segment (also referenced herein as stage), generating transformed delay samples for stages where the stages are transformed to give an expected correlation with previous stages, and performing a statistical addition of the transformed delay samples along respective paths where common segments of different paths are analyzed using shared data (e.g. the transformed delay samples) for the shared segments. Thus, determining the arrival time distribution at the end of the respective paths by using statistical timing data that accounts for path and stage delay correlation.

The yield probability calculator 159 uses the results of the dependent path processor to determine the yield probability for the design being analyzed. The data upon which the yield probability calculator operates may be received from the dependent path processor 155 either directly, or through a database, e.g. from path delay/timing data 133. For example, the yield probability calculator uses the results of the dependent path processor 155 (e.g. statistical distribution of arrival time for the identified paths) to generate a yield probability results. The yield probability results are determined by comparing at least required arrival times for the analyzed paths with the calculated arrival times to determine statistical probability that the signals along the paths will not arrive within the required time and thus the likelihood that the chip will not meet design specifications (e.g. not reach the target operating frequency, not function properly/reliably, stop working all together, etc.). The results of the yield probability calculator 159 can be stored in the results data 135 for future retrieval or comparison to past results (e.g. for determining whether changes have improved the yield positively, negatively, or at all).

The system includes a database 130 which is illustrated as including statistical timing analysis data 131, path delay/timing data 133, and results data 135. In some embodiments, the database 130 comprises a single database with one or more subsets within that database for the statistical timing analysis data 131, path delay/timing data 133, and results data 135 as illustrated in the figure. However, in some embodiments the database comprises multiple separate databases on different computing systems and/or in different locations connected via electronic communication links (e.g. wired and wireless networks). The system may further include database access modules for accessing and storing the data, whether stored at a single database or at multiple databases.

The statistical timing analysis data 131 comprises any type of statistical on-chip variation analysis. For example, on-chip variation (OCV) analysis results are generated using standard OCV analysis, advanced OCV, stage based OCV, location based OCV, Statistical OCV, statistical static timing analysis (SSTA) or any number of other techniques.

The path delay/timing data 135 comprises sample data. The sample data corresponds to generated delay samples for respective segments associated with at least the paths identified for processing. In some embodiments, the path delay/timing data 133 includes the transformed delay samples, the arrival time results, and the other parameters relevant to timing such as required arrival time, slack, and a slack threshold(s).

The results of the yield probability calculation can be stored in the results data area 135, where any combination of previous results and relevant information may be stored, such as a history of results data and data representing deltas between different results.

In some embodiments, the actual data itself, stored in database 130, is organized in various manners including industry standard formats. For instance, a global table may be provided that includes entries that identify all the paths for processing, a table may identify a sets of delay samples corresponding to respective segments of the identified paths. In some embodiments, data is represented by structures or as entries in a relational table or linked list.

Figure 2:
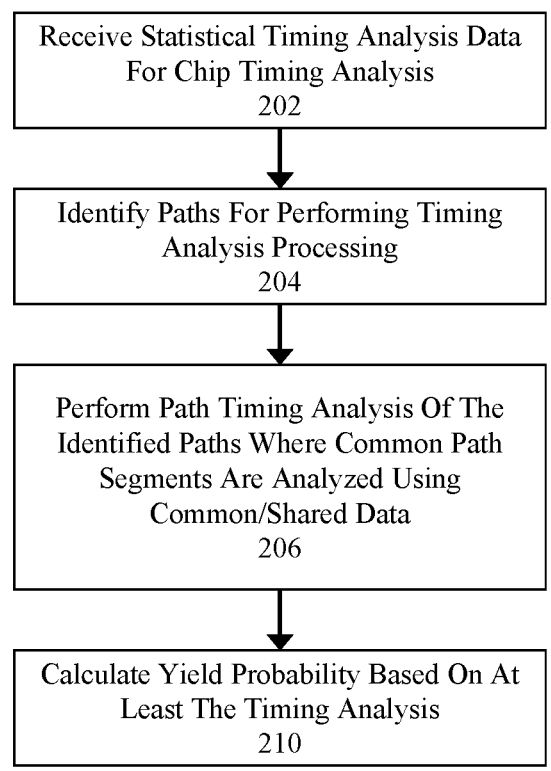
FIG. 2 illustrates a flow of an approach for yield calculation using statistical timing data that accounts for path and stage delay correlation.

FIG. 2 illustrates a flow of an approach for yield calculation using statistical timing data that accounts for path and stage delay correlation according to some embodiments of the invention.

At 202 statistical timing analysis data for chip timing analysis is received. The statistical timing analysis data (e.g. statistical timing analysis data 131) comprises any type of statistical on-chip variation analysis. For example, on-chip variation (OCV) analysis results are generated using standard OCV analysis, advanced OCV, stage based OCV, location based OCV, Statistical OCV, statistical static timing analysis (SSTA) or any number of other techniques.

At 204 paths are identified for performing timing analysis processing. One particular method of performing this process is discussed below in regard to FIG. 3. However, in brief the process identifies paths for processing based on at least some combination of the statistical timing analysis data, user input, or some other data corresponding to the design under test.

Path timing analysis is performed at 206 for the identified paths where common path segments are analyzed using common/shared data. One particular flow for performing this is discussed below in regard to FIG. 4. However, generally the process performs path processing where the common segments of different paths are processed using common/shared data. For example, where two paths share one or more common segments, those common segments may be associated with the same set or sets of delay samples where both paths are then analyzed to determine arrival time using the shared set of samples, thus accounting for path correlations. Furthermore, in some embodiments the shared set of samples may comprise delay samples that are transformed to provide an expected correlation between subsequent stages to account for stage delay correlation.

Yield probability can be calculated using the results of the path timing analysis of the identified paths at 210. This will be discussed further in regard to FIGS. 7A-B. However, since the present technique uses the results of the path timing analysis, the yield probability calculation also accounts for the path and stage correlations, whereas prior techniques do not accounts for the path and stage correlations as they merely provide results for respective paths analyzed independently (e.g. without using common data for shared segments and without accounting for stage to stage correlations).

Figure 3:
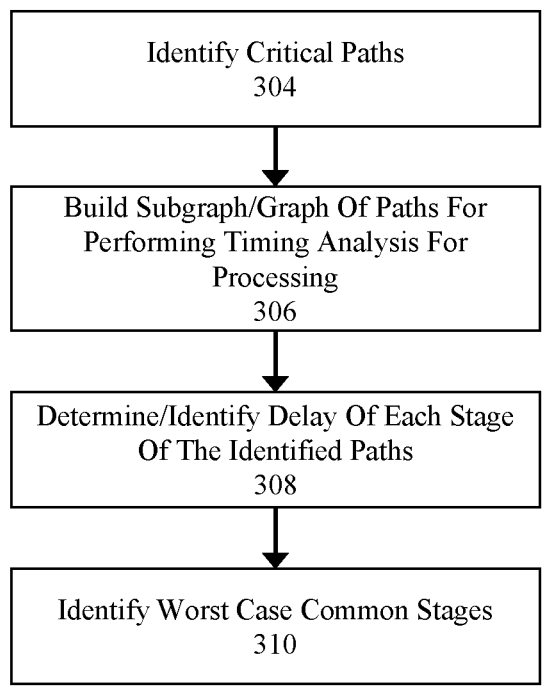
FIG. 3 illustrates a flow of an approach for the step of identifying paths for performing timing analysis processing illustrated in FIG. 2.

FIG. 3 illustrates a flow of an approach for the step of identifying paths for performing timing analysis processing illustrated in FIG. 2.

At 304 paths are identified as critical based on at least the statistical timing analysis data 131. For example, the critical paths may comprise the paths analyzed independently (e.g. without using shared data for different paths) where the analysis determines that the critical paths are paths that have zero or less slack, a slack below a give threshold, are otherwise identified as being critical (e.g. identified by a user at the time of analysis, or identified by a designer prior to performing analysis).

In some embodiments, the identified critical paths 304 are used to build a subgraph of a graph of paths for performing timing analysis for processing. For instance, the critical paths may be identified at 304 from a larger graph of paths representing all paths within a circuit design being analyzed, paths that meet one or more conditions in the circuit design being analyzed, or some subset of possible paths within the circuit design being analyzed. Regardless, the paths identified as critical are used to build a subgraph of paths for performing processing.

The critical paths can be processed at 308 to determine/identify the delay of each stage of the identified paths. In some embodiments, the critical paths are represented by the subgraph of critical paths. Subsequently the determined/identified delay of each stage is processed to identify the worst case common stages at 310. As an example, east stage delay is represented by a random variable, which may have different statistics, e.g. mean, standard deviation, or parameters such as probability density functions, and for each stage there can be multiple ways for signals to arrive at that particular stage, each way having/associated with its own delay. Thus, the worst case delay is selected from the delays of all the possible routes that arrive at that particular stage. What constitutes the worst case can vary based on one or more factors, e.g. from the means, quantiles, or any other factor/variable/parameter, whether separately or together, and whether weighted or otherwise. In some embodiments, a graph may already have worst case information integrated within the graph, in other cases the worst case information may be determined by processing a set of paths as discussed above.

Figure 4:
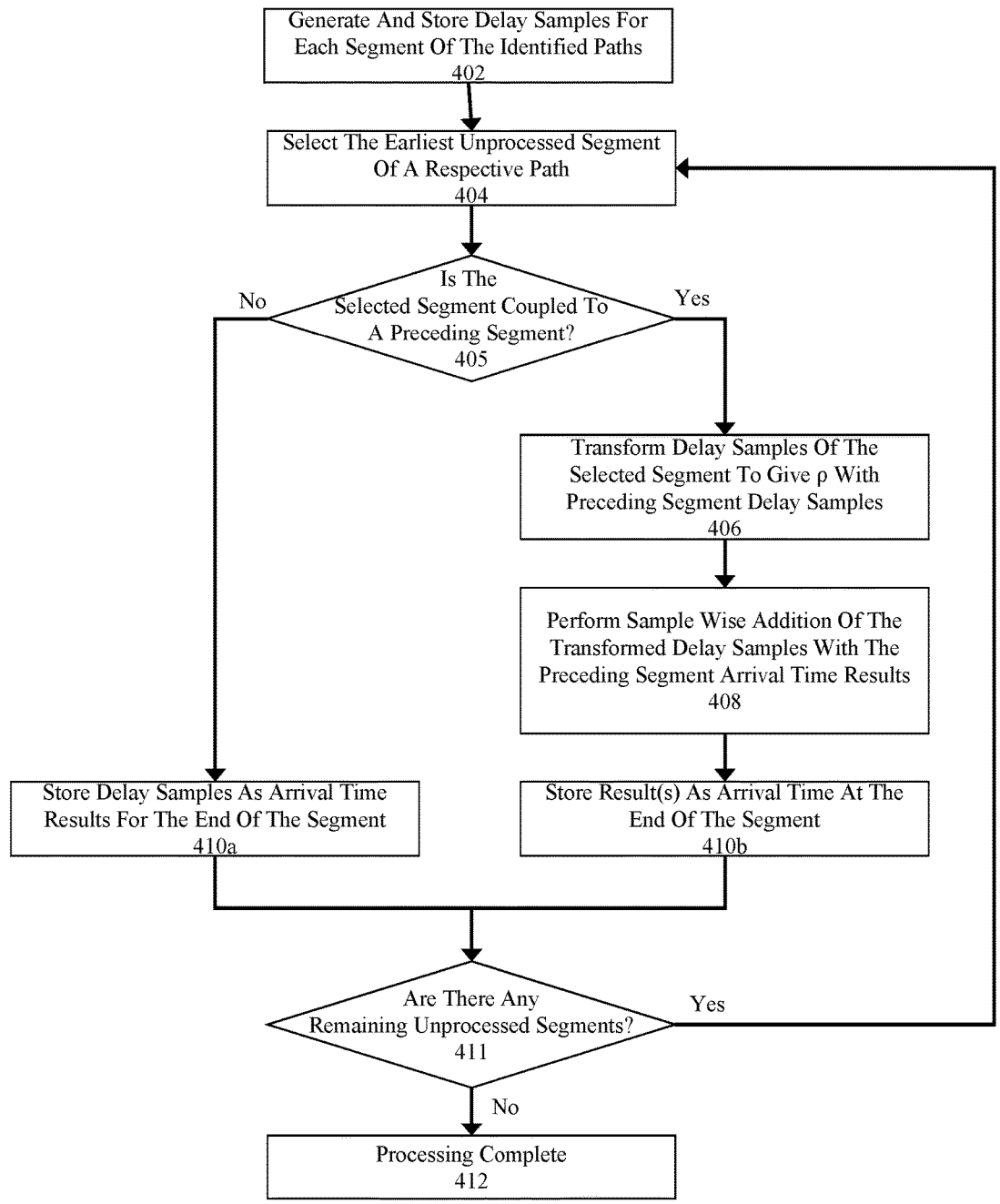
FIG. 4 illustrates a flow of an approach for the step of performing path timing analysis illustrated in FIG. 2.

FIG. 4 illustrates a flow of an approach for the step of performing path timing analysis illustrated in FIG. 2.

The approach includes generating and storing delay samples for each segment of the identified paths at 402, where each segment is associated with one set of delay samples. For example, each path is associated with a number of segments, where some of the segments are shared between paths and some segments are not shared with other paths. The sets of delay samples are generated for each segment (e.g. 1 k, 5 k, 10 k delay samples) and stored for future processing. One way to generate samples comprises generating samples from a given distribution and then transforming them to any necessary distribution—e.g. using a pseudo-random number generator.

At 404 an earliest unprocessed segment of a respective path is selected for processing. The paths themselves may be selected based on various aspects. For instance, a path may be selected based on the type of signal the path is intended to carry (e.g. clock, data, control), frequency or timing parameters for the signal, the relative position of the path in a dataset, a path name, any other relevant parameter, or combination thereof. Regardless, for any particular path selected the earliest unprocessed segment in that path will be selected for processing before a latter segment is selected for processing.

Once a segment is selected a determination is made as to whether the selected segment is coupled to a preceding segment at 405. For instance, if the segment is the first segment in a particular path then the segment won't have a preceding segment and thus is the earliest segment in that particular path. In some embodiments, paths correspond to circuit elements between clocked elements (e.g. latches or flipflops), thus multiple paths may be connected to one or more previous or subsequent paths but those previous/subsequent paths are analyzed separately from the particular path.

If, at 405, it is determined that the selected segment does not have a preceding segment in the path (e.g. the segment is the first segment of the path) then the process continues at 410a where the delay samples corresponding to the selected segment are stored as arrival time results for the end of the selected segment. Later, when a different path is analyzed that shares the same segment the same stored delay samples (e.g. stored as the arrival time for the end of the segment) will be used for analysis to account for the correlation between paths.

At 411 it is determined whether there are any remaining unprocessed segments, whether for the same path or for a different path from the currently selected path. If there are any remaining segments for analysis the process continues at 404 where another unprocessed segment is selected. In some embodiments, segments selected for processing are selected from a previously selected path that is the same path as the path last processed. In some embodiments, segments for processing are selected based on their position corresponding to other segments, such that a later segment is processed only after all earlier segments are processed.

If, at 405, it is determined that the selected segment is coupled to a preceding segment of a respective path the process proceeds at 406 where the delay samples generated at 402 for the selected segment are transformed to give an expected p (correlation) with the preceding segment. By transforming the delay samples of the selected segment to have the proper relationship with the previous segment (e.g. giving p) the process accounts for the correlation between a preceding segment and a subsequent/selected segment. For instance, transforming the sample to give the expected correlation by heuristically rearranging the samples so they give the expected correlation by rank. In some embodiments, the transformed delay samples are stored for future use, such as when another path includes the same segment, thus avoiding unnecessarily having to transform the same segment twice.

After the delay samples are transformed or the transformed delay samples are retrieved from a storage location, arrival time results of the immediately preceding segment (e.g. generated at 410a previously discussed or 410b to be discussed below) are added to the current segment. The transformed delay samples and the immediately preceding arrival time results are added together using a sample wise method. Thus, generating arrival time results that account for correlations between paths and between stages. The arrival time results for the selected segment are then stored at 410b for use in subsequent processing.

The process continues to loop through 404-411 until there are no more segments remaining for processing. At which time, the process is completed at 412.

In some embodiments, transformed delay samples can be generated prior to determining the arrival times for separate paths. For example, after generating the delay samples at 402 the transformed delay samples can be generated and stored (as discussed in regard to 406) before performing the functions of 404-412.

Figure 5A:
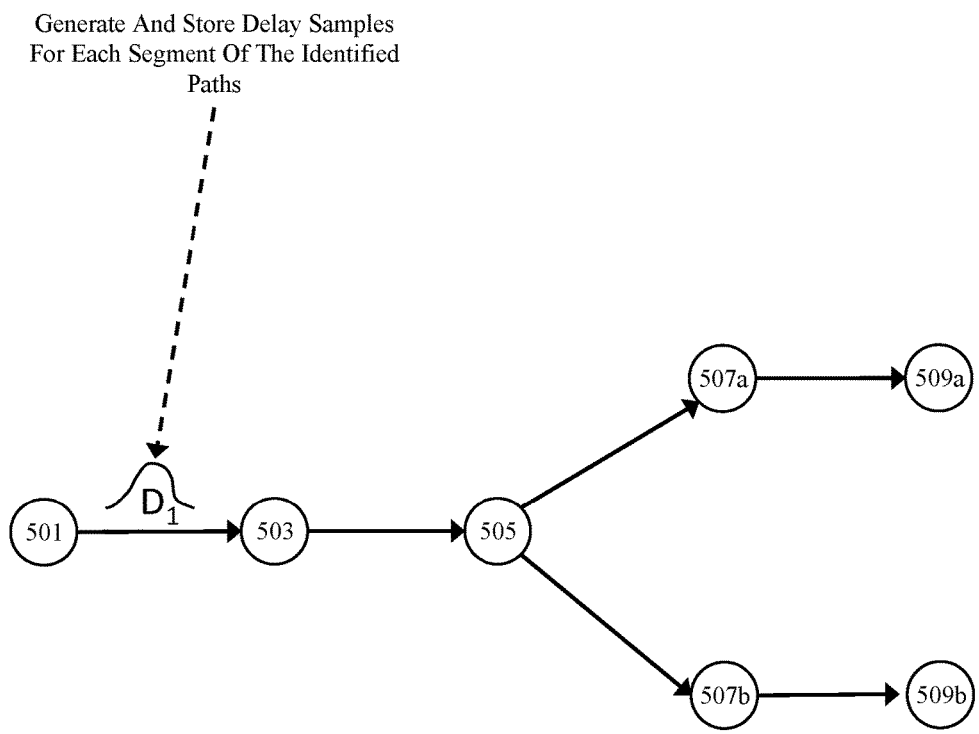
FIGS. 5A-W provide an illustrative example of the approach for yield calculation using statistical timing data that accounts for path and stage delay correlation.
Figure 5B:
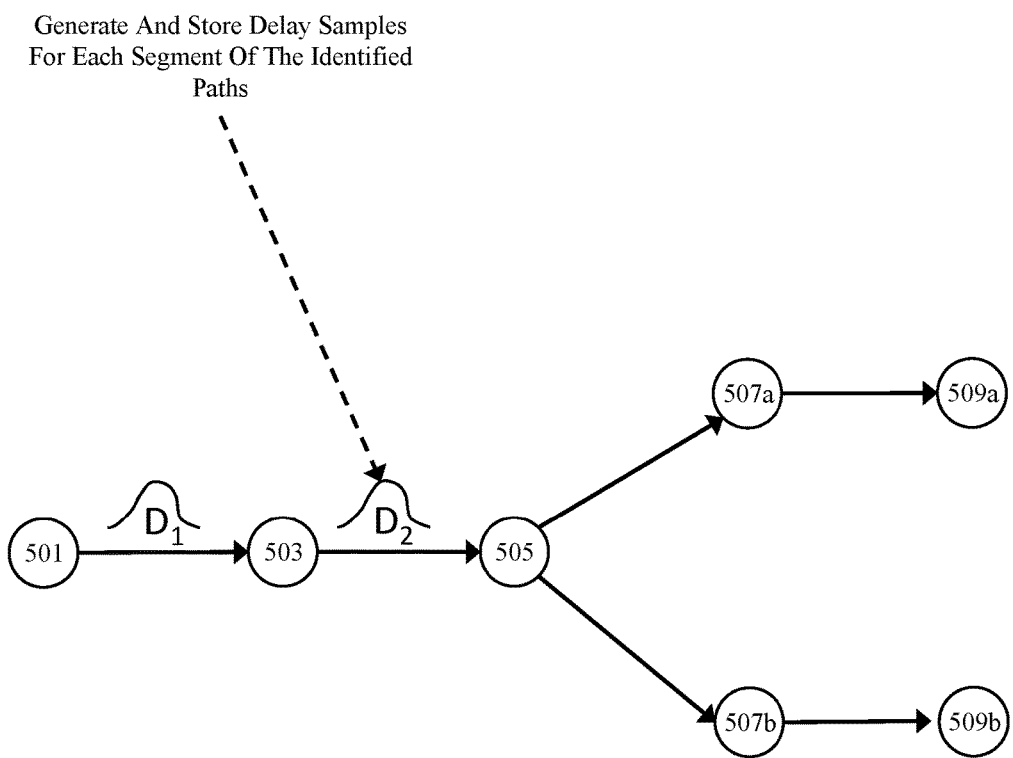
Figure 5C:
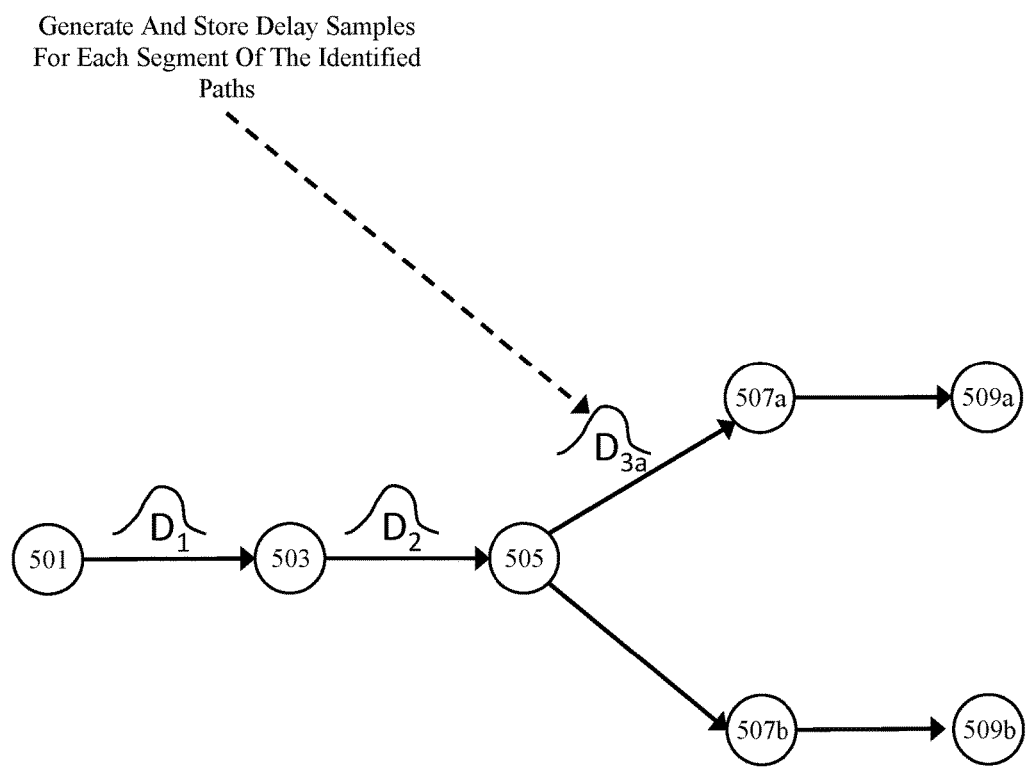
Figure 5D:
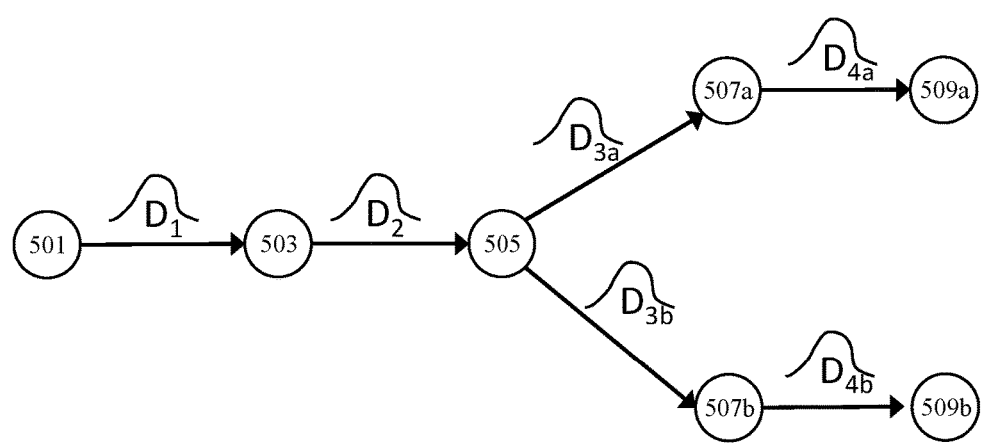
Figure 5E:
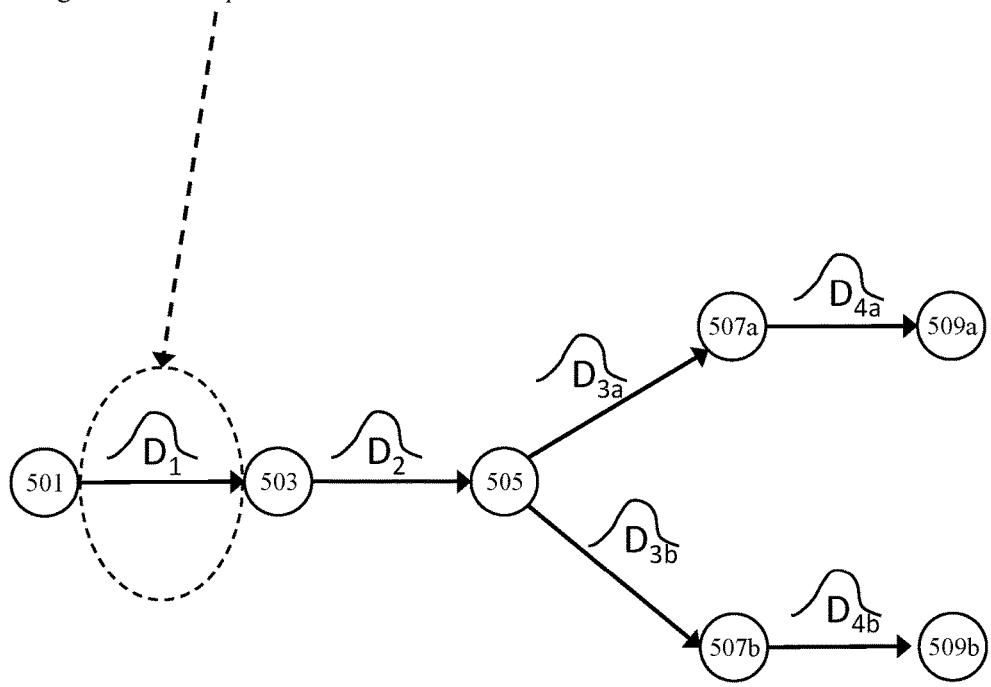
Figure 5F:
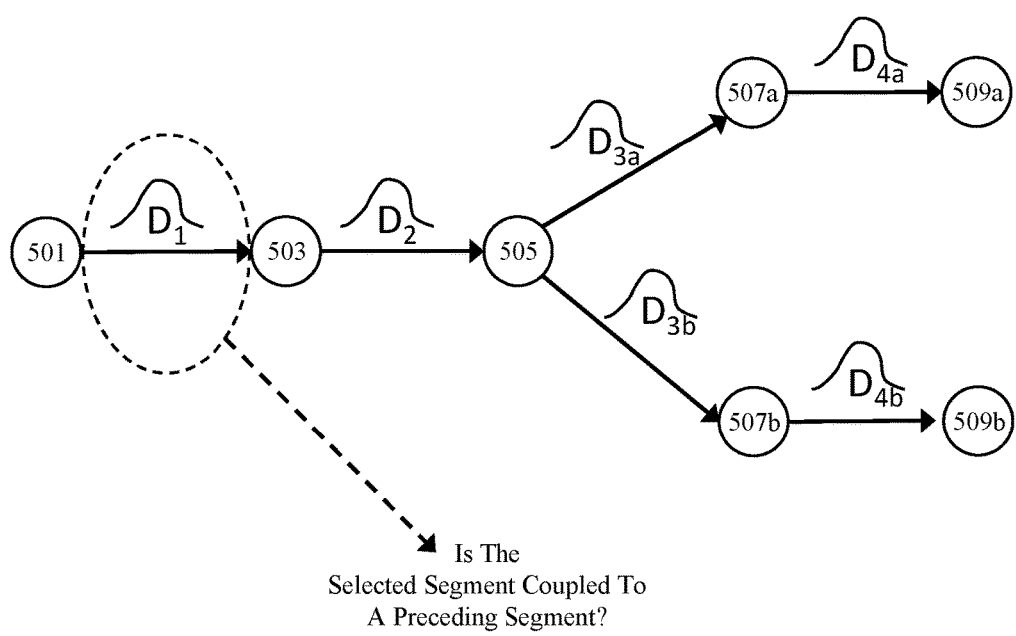
Figure 5G:
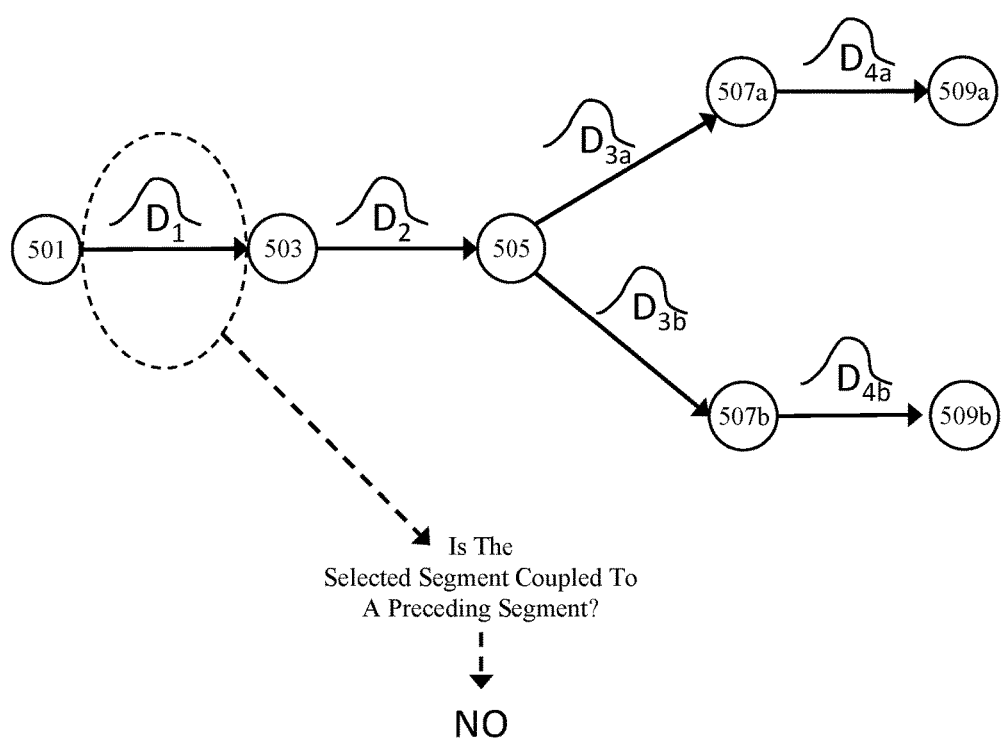
Figure 5H:
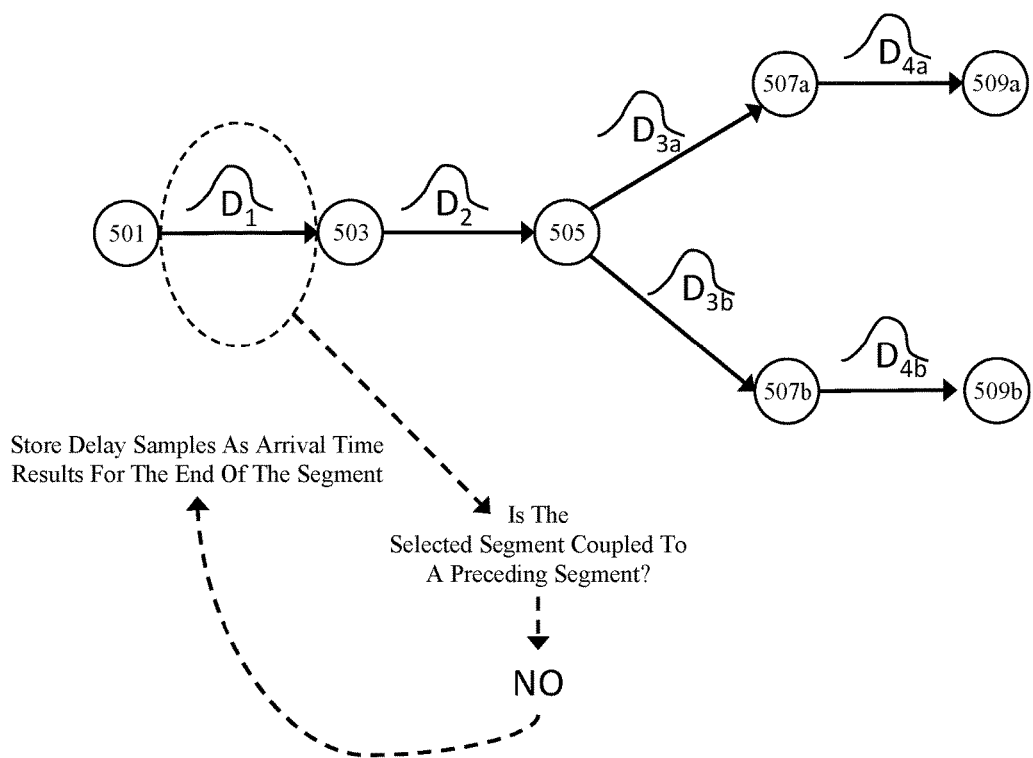
Figure 5I:
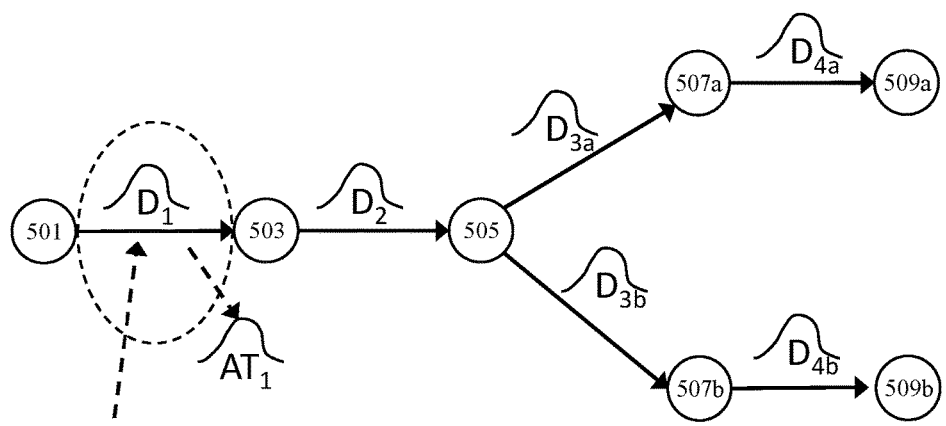
Figure 5J:
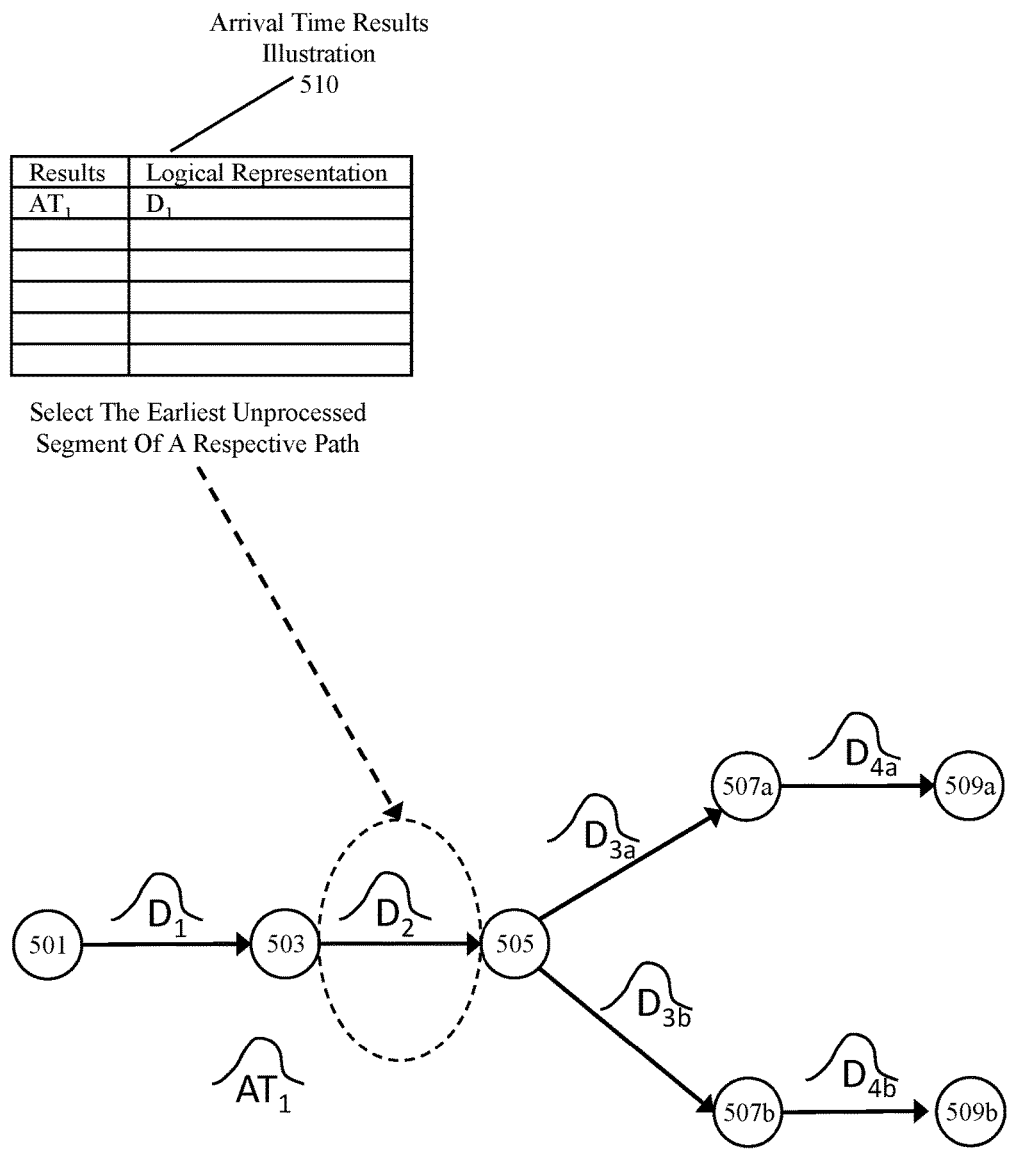
Figure 5K:
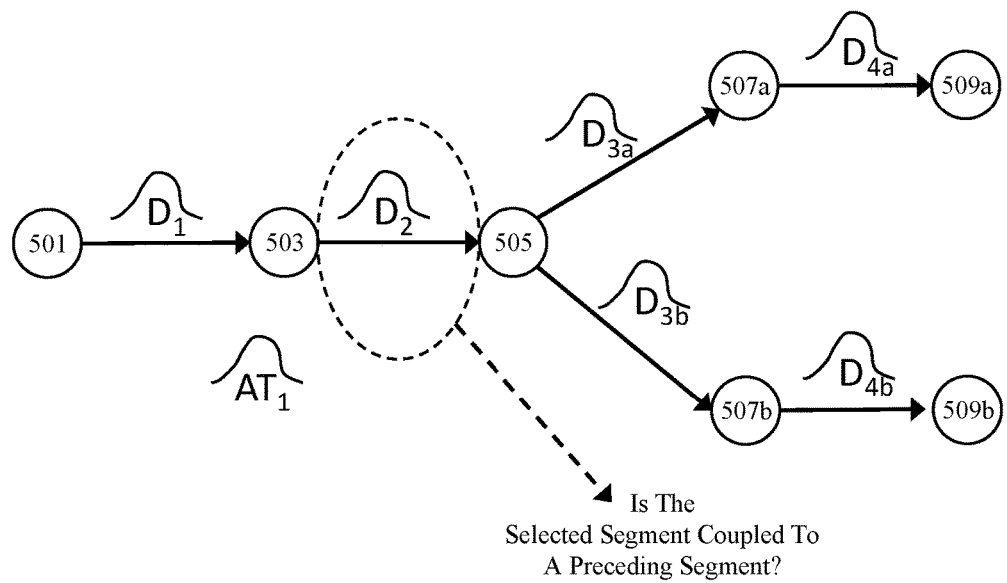
Figure 5L:
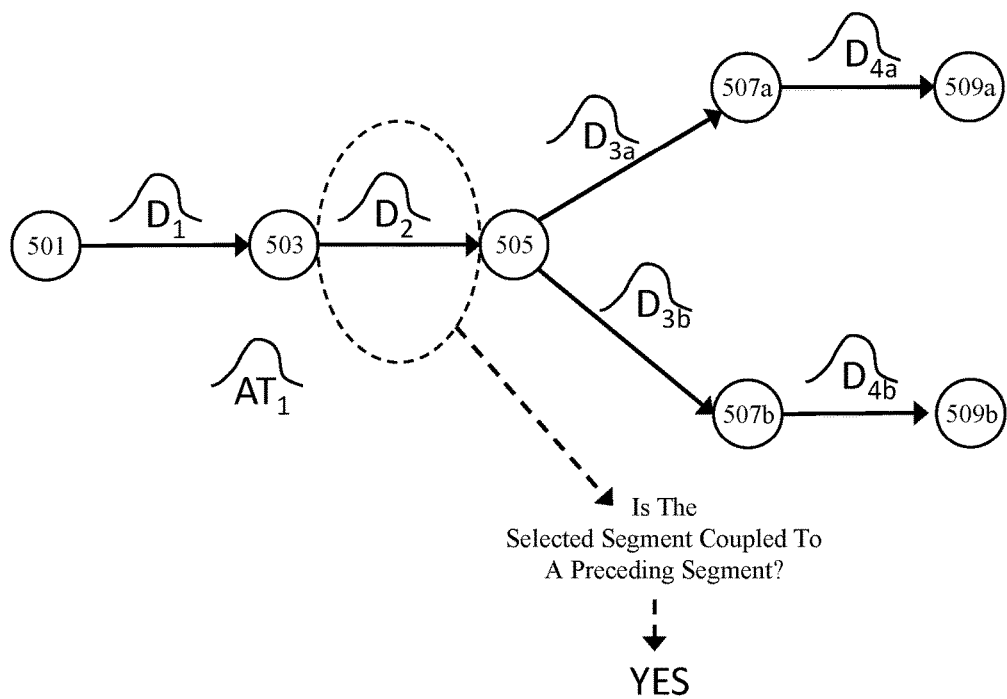
Figure 5M:
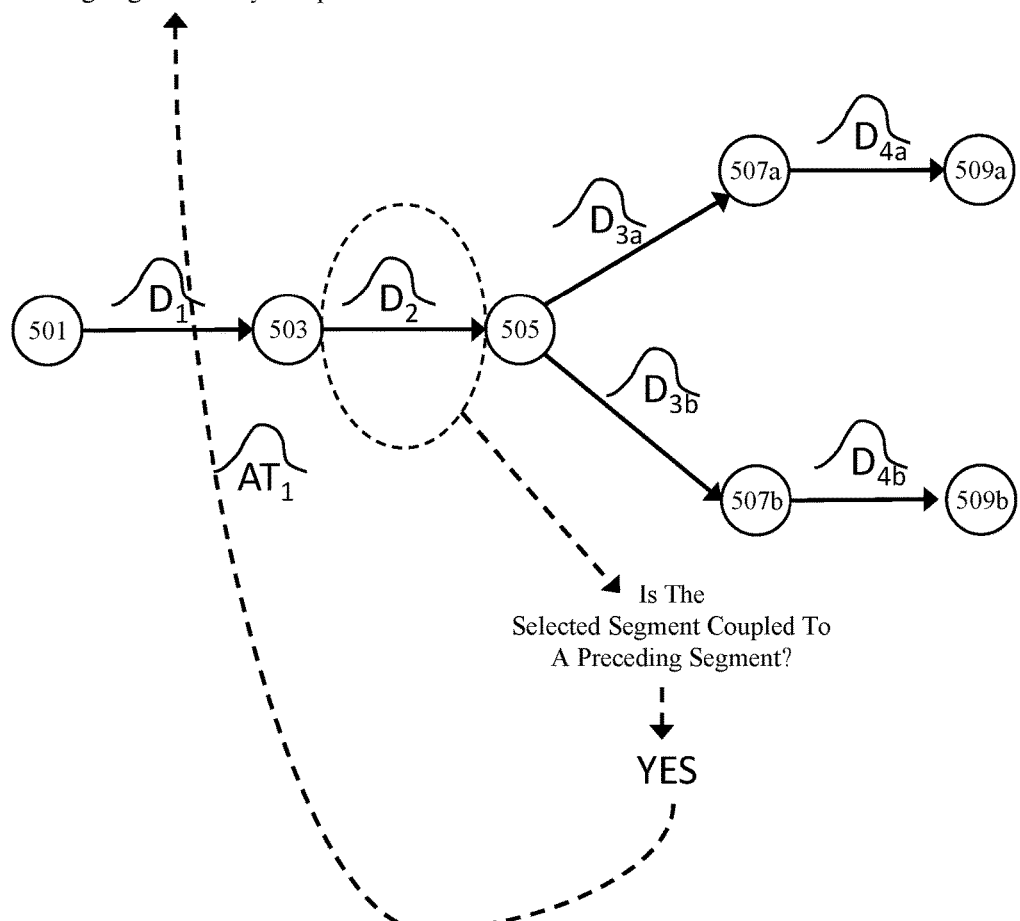
Figure 5N:
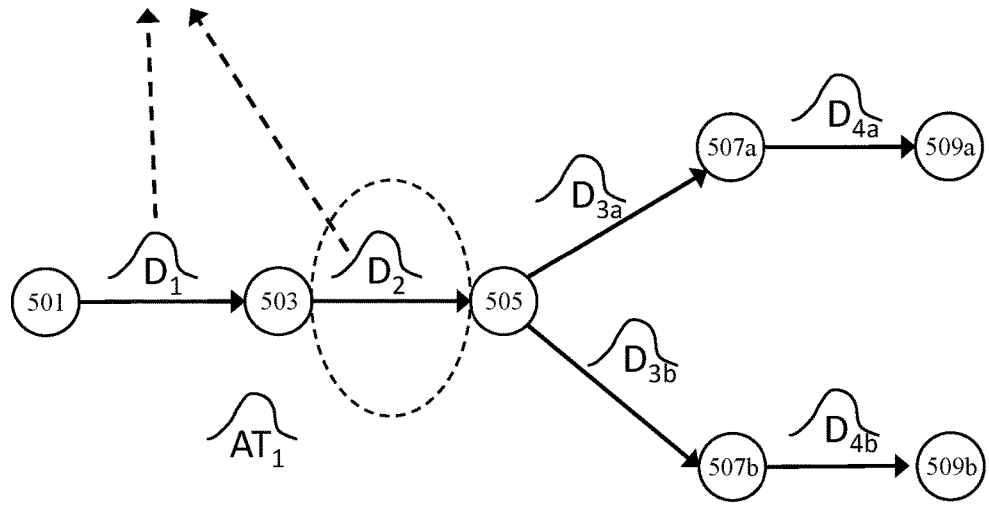
Figure 5O:
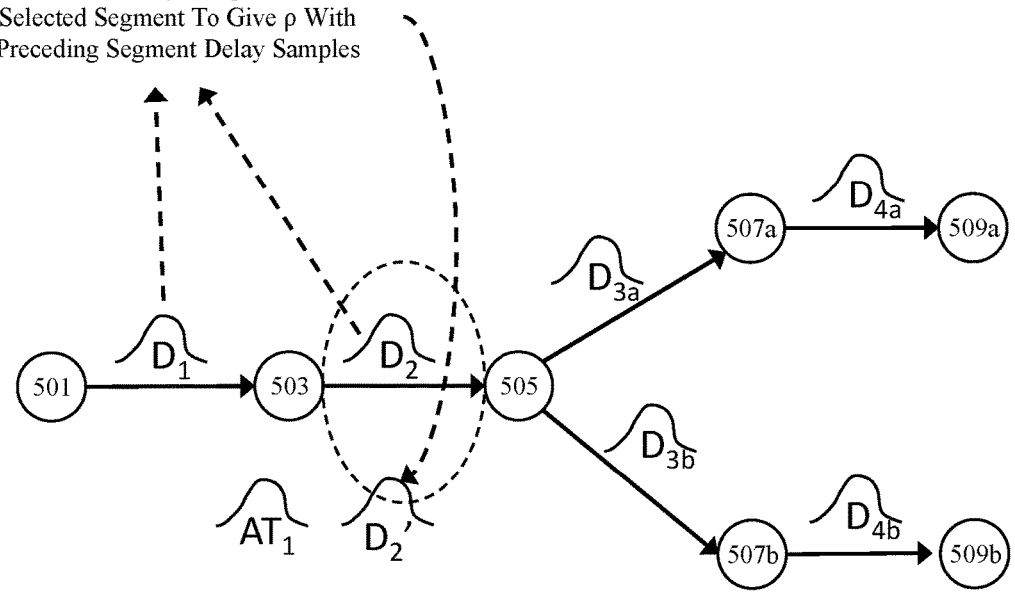
Figure 5P:
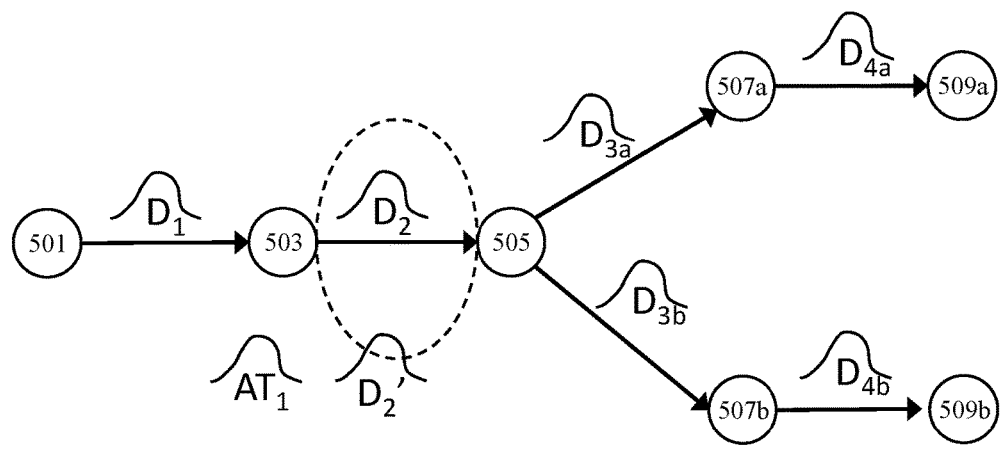
Figure 5Q:
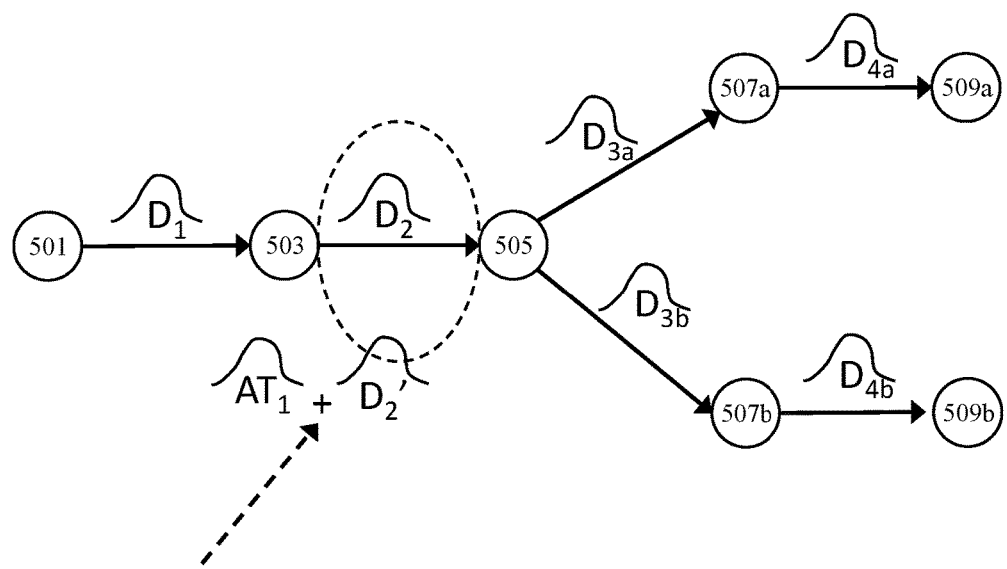
Figure 5R:
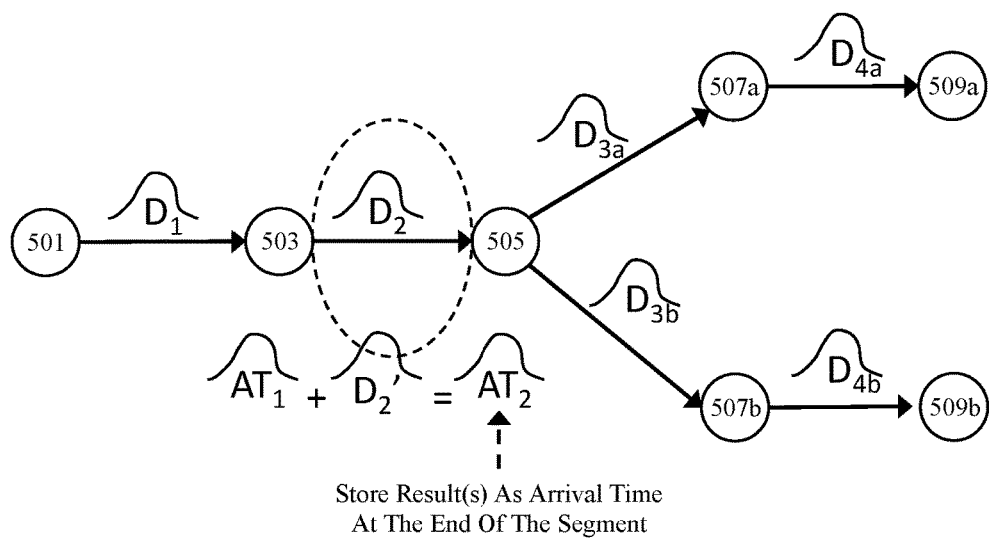
Figure 5S:
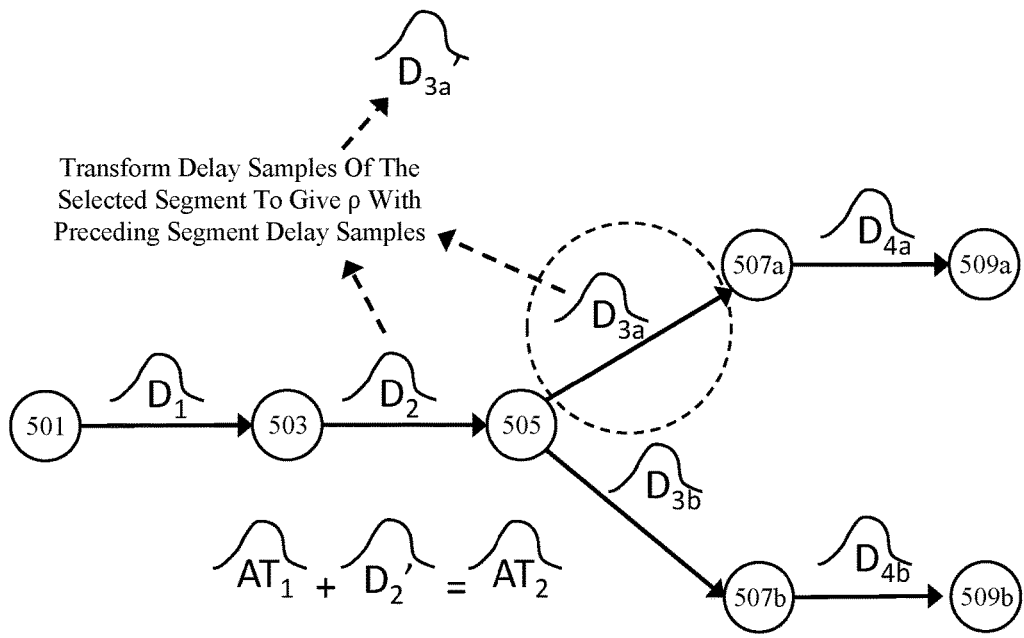
Figure 5T:
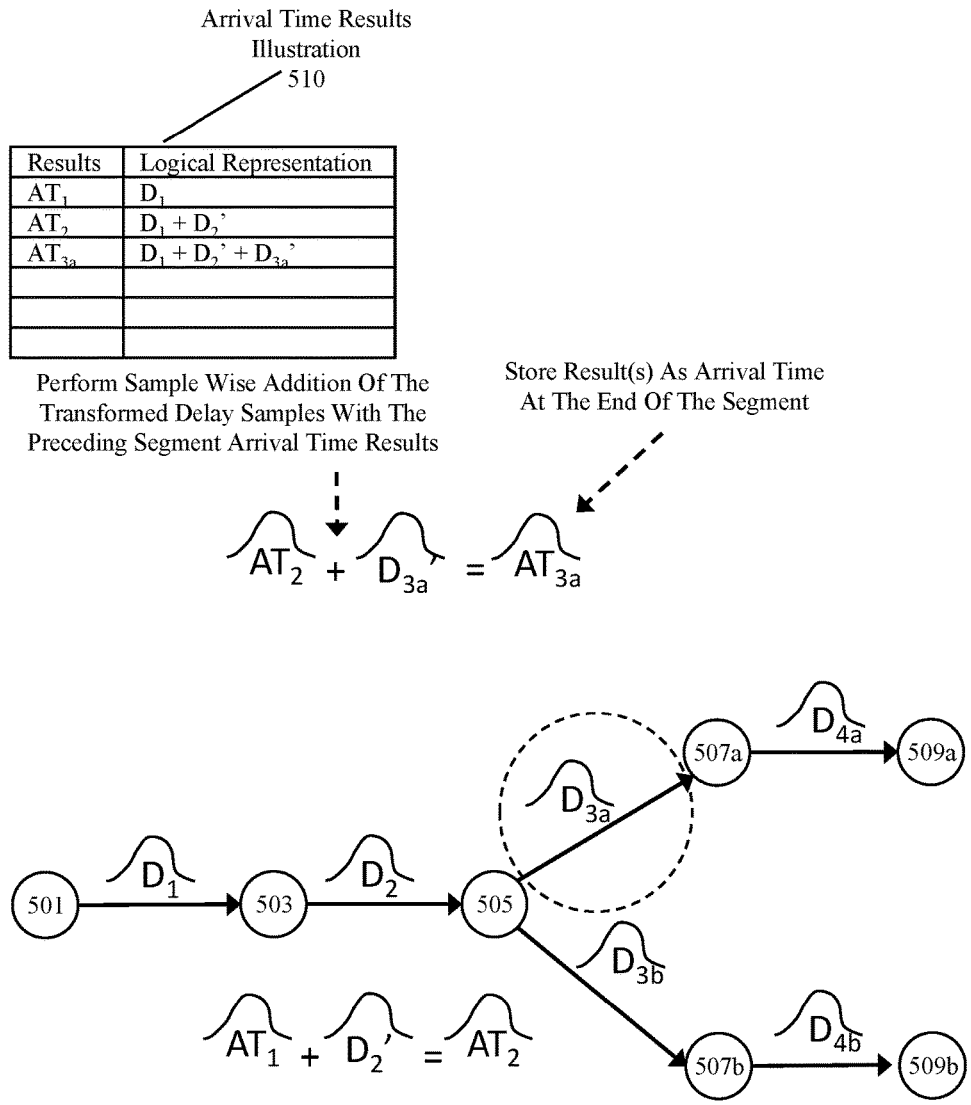
Figure 5U:
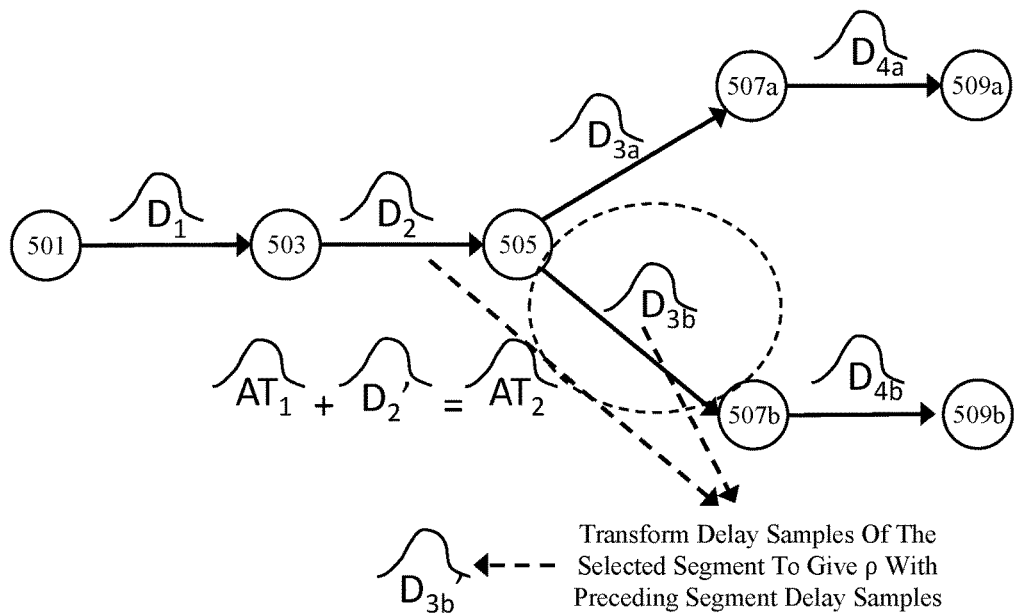
Figure 5V:
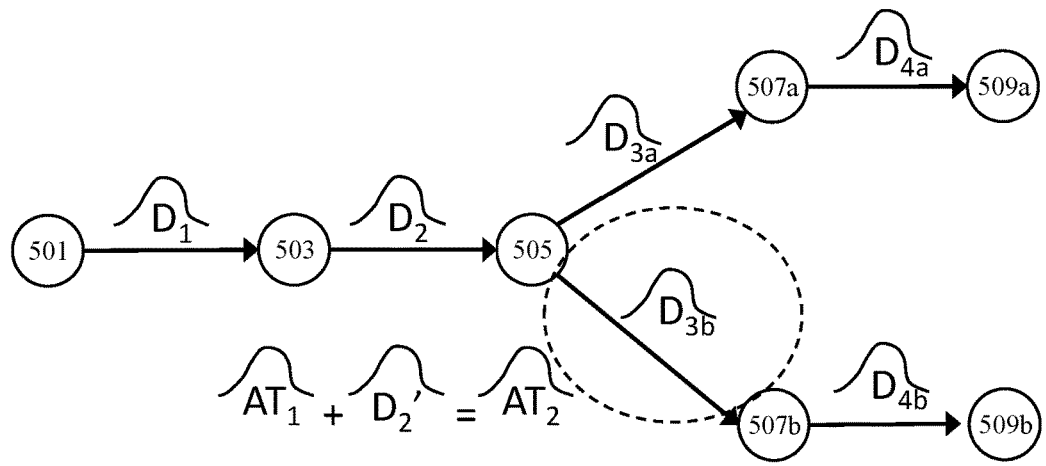
Figure 5W:
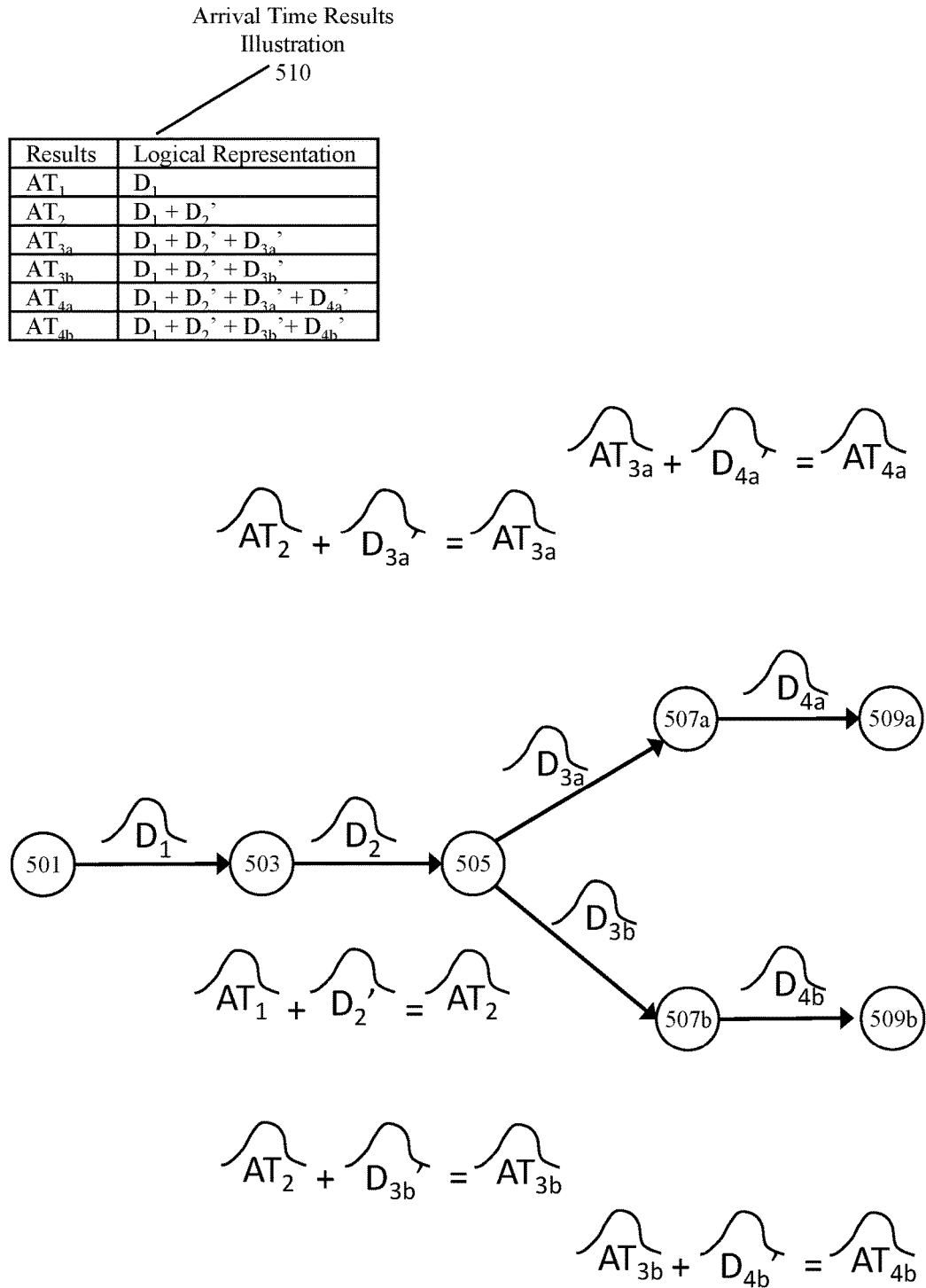

FIGS. 5A-W provide an illustrative example of the approach for yield calculation using statistical timing data that accounts for path and stage delay correlation. Specifically, FIGS. 5A-X illustration performing the process illustrated in at least FIG. 4. On a set of paths similarly arranged as shown in illustration 111b.

FIG. 5A illustrates a circuit having elements 501, 503, 505, 507a-b, and 509a-b along two paths represented by 501→503→505→507a→509a and 501→503→505→507b→509b. Furthermore, FIGS. 5A-D illustrate generating of sets delay samples for 501 to 503 ($D_1$), 503 to 505 ($D_2$), 505 to 507a ($D_{3a}$), 507a to 509a ($D_{4a}$), 505 to 507b ($D_{3b}$), and 507b to 509b ($D_{4b}$) corresponding to step 402 discussed above.

FIGS. 5E-I illustrate the process of generating arrival time results for a first selected segment. This process as illustrated includes selecting a segment for processing (see FIG. 5E and 404), determining that the segment is not coupled to a preceding segment (see FIGS. 5F-G and 405), and storing the delay samples ($D_1$) as the arrival time ($AT_1$) results for the end of the segment (see FIGS. 5H-I and 410a). Furthermore, FIG. 5I includes an arrival time results illustration 510. Here the arrival time illustration includes a results column and a logical representation column where the logical representation column shows logically what a value in the corresponding row of a results column represents. A first entry has been added to the illustration 510 for arrival time results for the first segment illustration showing that results ($AT_1$) can be logically represented as the delay samples for the first stage ($D_1$).

FIGS. 5J-R illustrate the process to generate arrival time results for a subsequent segment (503 to 505). As illustrated, this includes selecting a subsequent stage (see FIG. 5J and 404), determining that the selected segment is coupled to a preceding segment (see FIGS. 5K-L and 405), transforming the delay samples of the selected segment ($D_2$) to give p with the preceding segment (see FIGS. 5M-O and 406), and performing sample wise addition of the previous segments arrival time with the transformed delay samples ($D_2'$) for the selected segment to generate the corresponding arrival time for the selected segment ($AT_2$) (see FIGS. 5P-R and 408). Additionally, FIG. 5R updates illustration 510 to show that $AT_2$ corresponds to the sum of $D_1+D_2'$.

FIGS. 5S-T illustrate the process as it corresponds to an upper path of two possible paths (e.g. 501→503→505→507a→509a). Here the path diverges from a lower portion. However, the process is still essentially the same as previously discussed, where the delay samples for the selected segment ($D_{3a}$) are transformed to give ρ with the preceding segment samples ($D_2$) to generate transformed delay samples ($D_{3a}'$) (see FIG. 5S) and performing a sample wise addition of the previous segment's arrival time ($AT_2$) with the selected segments transformed delay samples ($D_{3a}'$) (see FIG. 5T). In FIG. 5T a third entry has been added to the illustration 510 for the 505→507a segment showing that results ($AT_{3a}$) can be logically represented as the delay samples for the first stage ($D_1$) the transformed samples of the second segment and the currently selected segments.

FIGS. 5U-V are equivalent to FIGS. 5S-T but for the path lower path (e.g. 501→503→505→507b→509b) where the delay samples for the selected segment ($D_{3b}$) are transformed to give p with the preceding segment samples ($D_2$) to generate transformed delay samples ($D_{3b}'$) (see FIG. 5U) and performing a sample wise addition of the previous segment arrival time ($AT_2$) with the selected segments transformed delay samples ($D_{3b}'$) (see FIG. 5V). Likewise, in FIG. 5V illustration 510 has been updated to include an entry for 505→507b showing results ($AT_{3a}$) can be logically represented as the delay samples for the first stage ($D_1$) the transformed samples of the second segment and the currently selected segments. The last figure in the set (FIG. 5W) includes illustrations representing the transformation of the last segments (507a→509a and 507b→509b), the computation of the arrival time for those segments, and the addition of the arrival time results for those segments to illustration 510 ($AT_{4a}$ logically represented by $D_1+D_2'+D_{3a}'+D_{4a}'$ and $AT_{4a}$ logically represented by $D_1+D_2'+D_{3b}'+D_{4b}'$). Thus, correlations between paths are accounted for by using the same sample sets for analysis of different paths (here $D_1$ & $D_2/D_2'$ samples are shared across both paths), and correlations between segments are accounted for by using the transformed delay samples for subsequent segments where the transformation accounts for stage correlation—e.g. $D_2'$, $D_{3a}'$, $D_{4a}'$, $D_{4b}'$.

Figure 6:
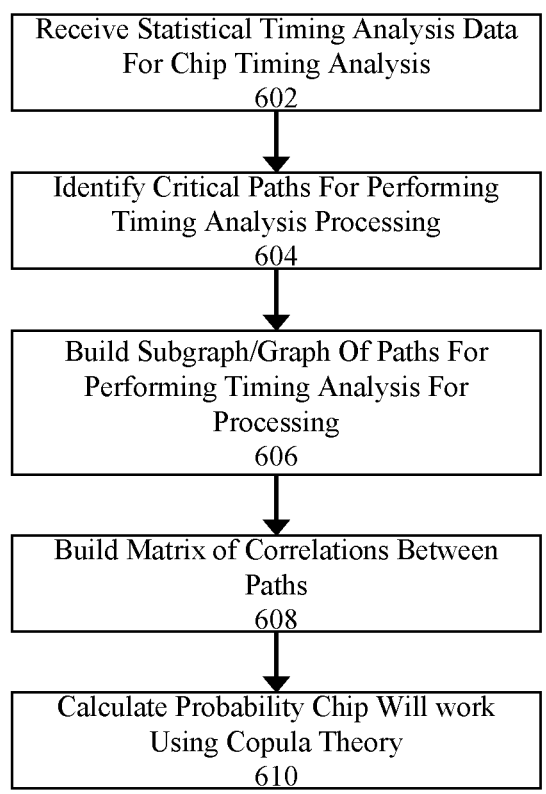
FIG. 6 illustrates a flow of an alternative approach for yield calculation using statistical timing data that accounts for path and stage delay correlation.

FIG. 6 illustrates a flow of an alternative approach for yield calculation using statistical timing data that accounts for path and stage delay correlation.

Similar to FIG. 2, FIG. 6 includes receiving statistical timing analysis data for chip timing analysis at 602 corresponding to 202 and identifying critical paths for performing timing analysis processing at 604 corresponding to 204. Additionally, FIG. 6 includes building a subgraph/graph of paths for performing timing analysis for processing at 606 correspond to 306 of FIG. 3.

However, the alternative approach of FIG. 6 diverges from the previous approaches at 608 where the previous approach performed analysis using sample sets, the alternative approach uses a generated matrix of correlations (correlation matrix) between paths (see 610) where the probability a chip will work is calculated based on at least the copula theory at 610 and using the correlation matrix.

The matrix of correlations between paths are generated at 608, where correlations can be calculated using correlation coefficients between two paths (e.g. $D_1$ and $D_2$) that can be expressed as follows:

$$\rho = \frac{\sigma_Z^2}{\sigma_{D_1}\sigma_{D_2}} \quad \text{(eq: 1)}$$

Where:
ρ represents the expected correlation between paths,
$\sigma_Z$ represents the standard deviation of delay of a common portion of two paths,
$\sigma_{D_1}$ represent the standard deviation of delay of the $1^{st}$ path ($D_1$), $\sigma_{D_2}$ represent the standard deviation of delay of the $2^{nd}$ path ($D_2$).

Once the matrix of correlations between paths is generated at 608, a probability that a chip manufacture using the logical design under analysis will work is calculated at 610 using copula theory and the correlation matrix. The probability that any particular logical design under analysis will work once manufactured is representable as $P(S_i>0 \ \forall i)=P(-S_i<0 \ \forall i)=F(-S_1, \ldots, -S_n)$, where $S_i$ is slack at an i-th endpoint in the joint distribution function F. From copula theory F can be expressed as superposition of copula function and distribution function of each slack: $F(-S_1, \ldots, -S_n)=C(F_1(-S_1), \ldots, F_n(-S_n))$. Here, $F_i$ is a distribution function of each slack obtained from results of timing analysis—e.g. statistical timing analysis data 131. The copula function may be any function which satisfies the definition of copula, and as used here represents dependencies between paths as represented by the correlation matrix. Various copula functions exist and may be selected based on at least computational complexity and accuracy desired to model the dependencies in any particular case. Examples of copula include Farlie-Gumbel-Morgenshtern copula: $C(u, v)=uv+3\rho uv(1-u)(1-v)$.

Figure 7A:
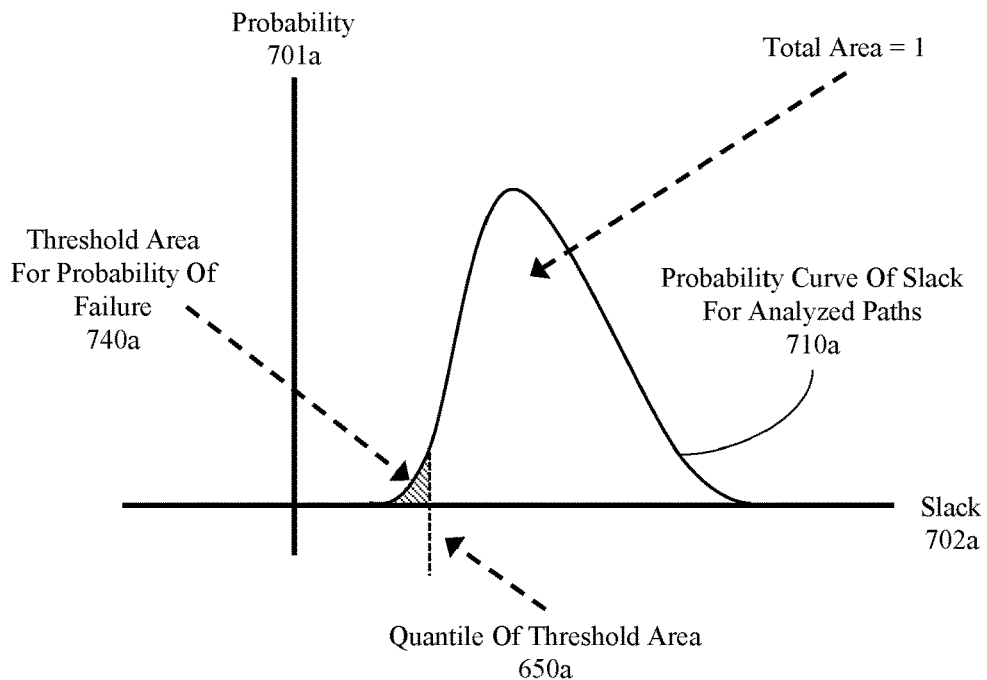
FIGS. 7A-B shows a graphical representation of two different yield probability calculation results.
Figure 7B:
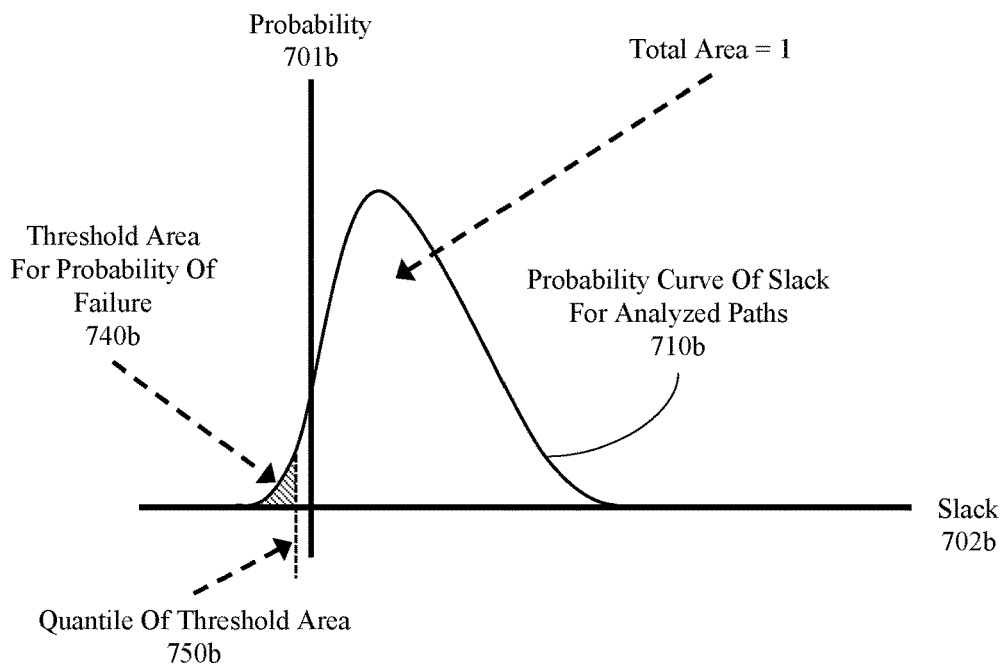

FIGS. 7A-B shows a graphical representation of two different yield probability calculation results. Particularly FIG. 7A illustrates a probability curve associated with a positive quantile while FIG. 7B illustrates a probability curve associated with a negative quantile.

FIG. 7A illustrates a probability curve of the worst slack for the analyzed paths. The curve is illustrated on a horizontal axis 702a representing the worst slack and a vertical axis 701a representing the probability of a particular value. The total area of the curve is equal 1 representing the total probability of all possible results. The slack results are determined from the results of the analyzed paths. Specifically, the probability curve can be determined by, for each endpoint, taking the required arrival time less the max of the calculated arrival time (e.g. the latest arrival time). This is advantageous because for some endpoints multiple paths will arrive at that same endpoint, thus the worst slack for all of those paths is the slack we are concerned with—e.g. latest arriving signal. Thus, the entire curve represents the distribution of the slack of the entire chip which corresponds to yield probability.

The quantile of the threshold area 650a represents the point at which a threshold value of an acceptable probability of failure rate is reached. For example, if the failure rate is not to exceed 0.01% (1 in 10,000) the quantile comprises the point along the slack axis where the area under the probability curve that is equal to 0.01%. Thus, FIG. 7A illustrates the threshold area for the probability of failure 740a when the threshold value associated with the quantile is equal to 0.01% of the area. The quantile 650a comprises the horizontal position along the slack axis where 0.01% of the probability distribution is reached and above that point is the remaining distribution 99.99%. Here, the illustration represents a very positive case where the probability curve is essentially entirely in the positive side of the probability axis. Thus, the quantile is a positive value and as such the threshold value is satisfied by the logical design as analyzed. In some embodiments, a threshold is not used, instead the yield probability is generated and then a determination is made as to whether the yield is acceptable, or successive generations are performed to determine if changes have improved the yield probability. Regardless, the expected yield corresponds to the area under the curve on the positive side of the probability axis.

FIG. 7B illustrates a less positive situation where a relatively significant amount of the curve is on the negative side of the probability axis 701b. Here 701b corresponds to 701a, 702b corresponds to 702a. Additionally, 740b, 750b, and 710b (corresponding to 740a, 750a, and 710a) are shifted to the left with respect to FIG. 7A representing analysis results having a much lower likelihood of satisfying the threshold level indicated above. Assuming the same threshold value and distribution pattern as above, the quantile 750b falls on the negative side of the slack axis 702b. Thus, FIG. 7B represents a result that does not meet the specified level of reliability as shown by the negative quantile result. Therefore, the threshold level would have to be increase (e.g. requires acceptance of a higher likelihood of failure) or the design would have to be modified to improve the yield probability.

System Architecture Overview

Figure 8:
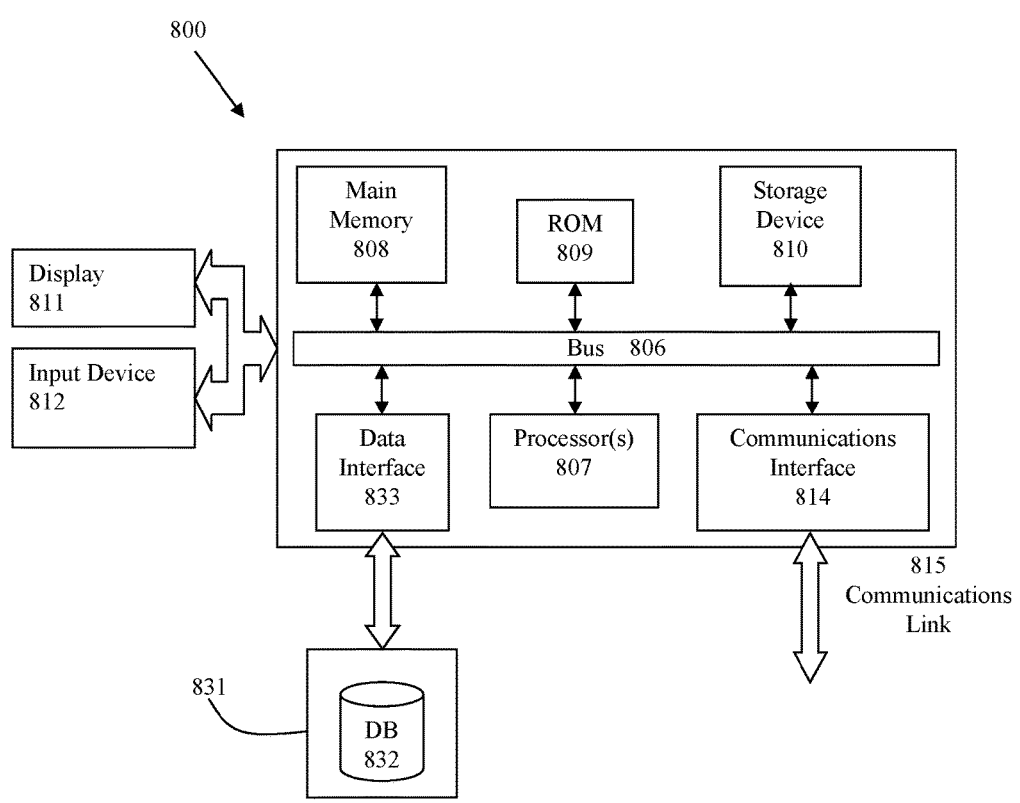
FIG. 8 shows an architecture of an example computing system with which the invention may be implemented.

FIG. 8 shows an architecture of an example computing system with which the invention may be implemented. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control.

According to one embodiment of the invention, computer system 800 performs specific operations by processor 807 executing one or more sequences of one or more instructions contained in system memory 808. Such instructions may be read into system memory 808 from another computer readable/usable medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. Computer system 800 may communicate through a data interface 833 to a database 832 on an external storage device 831.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for accounting for path and stage delay correlations, comprising:
    receiving statistical timing analysis data for a design to be analyzed;
    identifying a plurality of paths for performing timing analysis processing, wherein the plurality of paths comprise one or more stages; and
    performing path timing analysis on the plurality of paths, wherein common delay data is used for analysis of the one or more stages shared by two or more paths of the plurality of paths and a stage shared by different paths is represented by a same arrival time.

2. The method of claim 1, further comprising calculating yield probability based on at least the path timing analysis, wherein the yield probability comprises a probability that a particular chip will operate within specifications.

3. The method of claim 1, wherein identifying a plurality of paths for performing timing analysis processing comprises identifying critical paths.

4. The method of claim 3, wherein identifying a plurality of paths for performing timing analysis processing further comprises:
    identifying a delay of each stage of the plurality of paths; and
    identifying worst case common stages.

5. The method of claim 1, wherein performing path timing analysis on the plurality of paths comprises:
    generating a set of delay samples for each stage of the plurality of paths;
    storing the set of delay samples for each stage of the plurality of paths;
    generating sets of transformed delay samples from sets of delay samples for at least some of the one or more stages of the plurality of paths, wherein the sets of transformed delay samples comprise sets of delay samples transformed to give an expected correlation with a set of delay samples for a preceding stage of the one or more stages; and
    storing the sets of transformed delay samples.

6. The method of claim 5, wherein performing path timing analysis on the plurality of paths further comprises storing a set of delay samples for an earliest stage of a path as arrival time results for the earliest stage, wherein at least some of the paths of the plurality of paths are analyzed using the same delay samples and arrival time results.

7. The method of claim 6, wherein performing path timing analysis on the plurality of paths further comprises:
    performing a sample wise addition of a set of transformed delay samples for a selected stage and arrival time results for an immediately preceding stage to generate arrival time results for the selected stage; and storing the arrival time results for the selected stage.

8. The method of claim 2, wherein calculating yield probability comprises determining a smallest slack at endpoints associated with the one or more paths of the plurality of paths, slack comprising a required arrival time for a respective endpoint less a max of arrival time for each respective path that terminates at the endpoint.

9. A computer program product that includes a computer readable medium, the computer readable medium comprising a plurality of computer instructions which, when executed by a processor, cause the processor to execute a process for accounting for path and stage delay correlations, the process comprising:

receiving statistical timing analysis data for a design to be analyzed;

identifying a plurality of paths for performing timing analysis processing, wherein the plurality of paths comprise one or more stages; and performing path timing analysis on the plurality of paths, wherein common delay data is used for analysis of the one or more stages shared by two or more paths of the plurality of paths and a stage shared by different paths is represented by a same arrival time.

10. The computer program product of claim 9, the processes further comprising calculating yield probability based on at least the path timing analysis, wherein the yield probability comprises a probability that a particular chip will operate within specifications.

11. The computer program product of claim 9, wherein identifying a plurality of paths for performing timing analysis processing comprises identifying critical paths.

12. The computer program product of claim 11, wherein identifying a plurality of paths for performing timing analysis processing further comprises:

identifying a delay of each stage of the plurality of paths; and identifying worst case common stages.

13. The computer program product of claim 9, wherein performing path timing analysis on the plurality of paths comprises:

generating a set of delay samples for each stage of the plurality of paths;

storing the set of delay samples for each stage of the plurality of paths;

generating sets of transformed delay samples from sets of delay samples for at least some of the one or more stages of the plurality of paths, wherein the sets of transformed delay samples comprise sets of delay samples transformed to give an expected correlation with a set of delay samples for a preceding stage of the one or more stages; and storing the sets of transformed delay samples.

14. The computer program product of claim 13, wherein performing path timing analysis on the plurality of paths further comprises storing a set of delay samples for an earliest stage of a path as arrival time results for the earliest stage, wherein at least some of the paths of the plurality of paths are analyzed using the same delay samples and arrival time results.

15. The computer program product of claim 14, wherein performing path timing analysis on the plurality of paths further comprises:

performing a sample wise addition of a set of transformed delay samples for a selected stage and arrival time results for an immediately preceding stage to generate arrival time results for the selected stage; and storing the arrival time results for the selected stage.

16. A system for accounting for path and stage delay correlations, comprising:

a memory for storing instructions; and a processor which performs the following actions when executing instructions:

receiving statistical timing analysis data for a design to be analyzed;

identifying a plurality of paths for performing timing analysis processing, wherein the plurality of paths comprise one or more stages; and performing path timing analysis on the plurality of paths, wherein common delay data is used for analysis of the one or more stages shared by two or more paths of the plurality of paths and a stage shared by different paths is represented by a same arrival time.

17. The system of claim 16, wherein the actions further comprises calculating yield probability based on at least the path timing analysis, wherein the yield probability comprises a probability that a particular chip will operate within specifications and calculating yield probability based on at least the path timing analysis comprises determining a smallest slack at endpoints associated with the one or more paths of the plurality of paths, slack comprising a required arrival time for a respective endpoint less a max of arrival time for each respective path that terminates at the endpoint.

18. The system of claim 16, wherein identifying a plurality of paths for performing timing analysis processing comprises:

identifying critical paths;

identifying a delay of each stage of the plurality of paths; and identifying worst case common stages.

19. The system of claim 16, performing path timing analysis on the plurality of paths comprises:

generating a set of delay samples for each stage of the plurality of paths;

storing the set of delay samples for each stage of the plurality of paths;

generating sets of transformed delay samples from sets of delay samples for at least some of the one or more stages of the plurality of paths, wherein the sets of transformed delay samples comprise sets of delay samples transformed to give an expected correlation with a set of delay samples for a preceding stage of the one or more stages; and storing the sets of transformed delay samples.

20. The system of claim 19, wherein performing path timing analysis on the plurality of paths further comprises:

storing a set of delay samples for an earliest stage of a path as arrival time results for the earliest stage, wherein at least some of the paths of the plurality of paths are analyzed using the same delay samples and arrival time results;

performing a sample wise addition of a set of transformed delay samples for a selected stage and arrival time results for an immediately preceding stage to generate arrival time results for the selected stage; and storing the arrival time results for the selected stage.

* * * * *